Aug. 14, 1973   R. B. DOWNEY   3,752,722

METHOD OF MANUFACTURING PHOTOGRAPHIC FILM UNITS

Filed May 5, 1971   5 Sheets-Sheet 4

INVENTOR.
ROGERS B. DOWNEY

BY Brown and Mikulka
and
Robert E. Corb
ATTORNEYS

FIG. 14

United States Patent Office 3,752,722
Patented Aug. 14, 1973

3,752,722
METHOD OF MANUFACTURING PHOTOGRAPHIC
FILM UNITS
Rogers B. Downey, Lexington, Mass., assignor to
Polaroid Corporation, Cambridge, Mass.
Filed May 5, 1971, Ser. No. 140,537
Int. Cl. B31f 5/08; B32b 31/10, 31/18
U.S. Cl. 156—201
19 Claims

ABSTRACT OF THE DISCLOSURE

A method of fabricating and assembling a succession of photographic, self-developing film units each including photosensitive and second sheets secured in face-to-face relation at least along one end and two lateral margins; a container of processing liquid; means for collecting and retaining excess processing liquid overrun and spacing means for controlling processing. In the manufacturing method, a succession of spaced apart photosensitive sheets are joined together by narrow connecting strips to form a first web which is superposed with a second and wider web and laminated thereto to form a sandwich by distributing a laminating liquid between the webs while pressing them together and applying heat and pressure to the connecting strips to adhere them to the second web. Other components of the film units including containers, liquid trapping elements and associated components are mounted on the lateral portions of the webs and, as the last operation, the sandwich is severed transversely at the connecting strips to form individual film units.

In applicant's commonly assigned U.S. patent application, Ser. No. 102,447, filed Dec. 29, 1970 now U.S. Pat. 3,694,206, there is shown and described a self-developing, photographic film unit of the type adapted to be manufactured according to the method of the present invention. This film unit includes a pair of rectangular support sheets, one of which is transparent, secured in face-to-face relation at their lateral margins and at one end margin by binding strips. The margins of the transparent support sheet extend beyond the edges of the other sheet and the binding strips are secured to and overlap the lateral margins and one end margin of both sheets. A photosensitive image-recording layer and an image-receptive layer are sandwiched between the sheets preferably with the image-receptive layer closest the transparent sheet and supported thereon while the image-recording layer is supported on the other, smaller sheet. A container of liquid processing composition adapted to initiate formation of a visible transfer image in the image-receptive layer when distributed between the sheets for permeation into the photosensitive layer following exposure thereof, is coupled to the sheets at the other end edge of the smaller sheet so as to dispense its liquid contents between the sheets by and in response to the application of compressive pressure to the container. A masking layer including a reflective pigment carried in a binder is coated on the side of the transparent sheet facing the smaller sheet and extends to the edges of the transparent. The masking layer is formed with a rectangular opening smaller than the smaller sheet and is located between the image-recording layer and the transparent sheet to provide a reflective border surrounding the visible image formed in the image-receiving layer. The sheets and layers of the film unit are preferably laminated to one another to form an integral structure although the two support sheets and the layers carried thereon may be secured to one another only at their margins.

Obviously, film units of this type tend to be complex structures comprising a multiplicity of separate components which must be fabricated and assembled with a high degree of accuracy. However, for manufacture to be economically feasible, the fabrication and assembly process must be capable of being accomplished by high speed, automatic machinery so that it is an object of the invention to provide a method of manufacturing a succession of self-developing film units of the type described which lends itself to high speed, intermediate or continuous automatic machine fabrication and assembly.

This and other objects of the invention are achieved by a novel and improved fabrication and assembly process in which complex and difficult to perform operations are kept to a minimum, no operations are required to be performed on individual film units and a strong, stiff sheet material comprising the film units themselves is employed as a carrier for transporting the film units through the sequence of fabrication, assembly and inspection operations involved in their manufacture.

Other objects of the invention will in part be obvious and will in part appear hereinafter.

The invention accordingly comprises the method involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figures 1, 2:
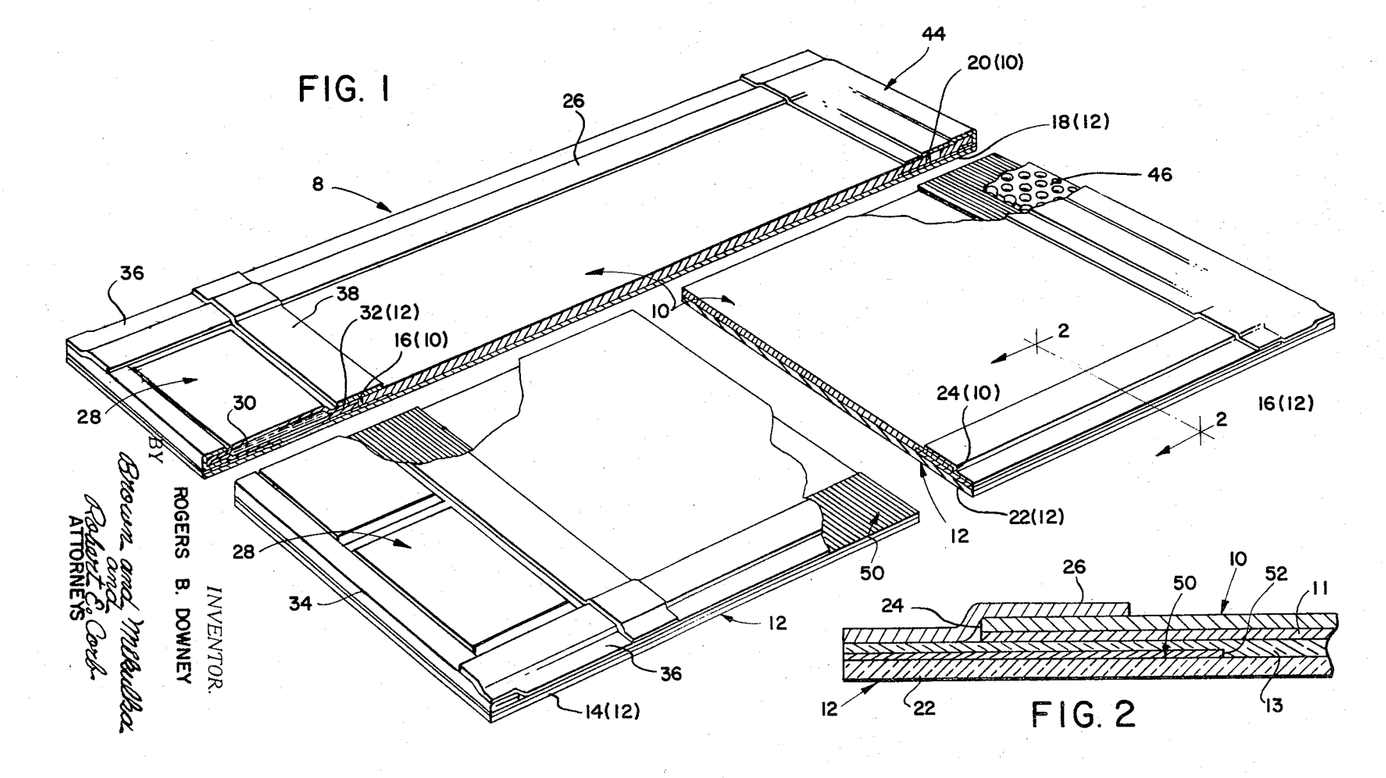
FIG. 1 is a somewhat schematic, perspective view partially in section, illustrating a photographic self-developing film unit manufactured according to the method of the invention.
FIG. 2 is a fragmentary sectional view taken along the lines 2—2 of FIG. 1.

The basic components of film unit 8 include a first rectangular, sheet-like element designated 10 and a second rectangular, sheet-like element designated 12. Each of these elements comprises a dimensionally stable support sheet coated thereon with some or all of the various layers and strata described in the aforementioned application and/or conventionally incorporated in photographic film units of this type. In the preferred embodiment shown and described, the first element 10 is preferably opaque to actinic light and includes a support sheet which, during the manufacturing process, is coated at least on one side with the photosensitive layer, generally designated 11 in FIG. 2, including, for example, a multiplicity of differently sensitized photosensitive strata and associated dye image-forming materials. It also may be coated during the manufacturing process with auxiliary layers and strata including an image-receptive layer, a layer for arresting or inhibiting the development process and/or a reflective layer for providing a background for a dye image supported by the image-receptive layer. The layer (or strata) coated on the support sheet comprising second element 12 is generally designated 13 in FIG. 2. The first element is substantially smaller than the second element and, in order to realize the largest possible cost-saving, it should support as many of the various layers as is possible.

Each of the sheet-like elements 10 and 12 comprises a dimensionally stable support sheet and the elements are secured to one another in face-to-face relation with the layers (11 and 13, respectively) coated thereon and comprising components of the dye image transfer system, e.g., the photosensitive and image-receptive layers, sandwiched between the support sheets. The layers 11 and 13 coated on the support sheets of elements 10 and 12 are designed to perform functions involved in the exposure and/or processing of the film unit to form a finished and attractive photographic print. In addition to the layers sandwiched between the supports, other layers may be coated on the outside of the supports for performing functions such as, for example, altering the optical properties of these supports, preventing abrasion, opacification, and the like. The support for element 10 is preferably opaque to actinic light to permit processing of the film unit in the light as well as to permit a plurality of the film units to be arranged in stacked relation in a film container or cassette and exposure of the film unit at one end of the stack without exposure of underlying film units. The support sheet for second element 12 is preferably transparent to permit photoexposure of the photosensitive layer sandwich between the support sheets and to permit viewing of the positive transfer image when image formation is completed. As examples of materials useful for the support sheets, mention may be made of polymeric films derived from ethylene glycol terephthalic acid, vinyl chloride polymers, polyvinyl acetate, cellulose derivatives, and the like.

Element 12 is substantially longer and wider than element 10 and includes a leading end section 14 extending beyond the leading edge 16 of first element 10; a trailing end section 18 extending beyond the trailing edge 20 of element 10 and lateral marginal sections 22 extending beyond the lateral edges 24 of element 10. The two sheets are preferably arranged with respect to one another so that the lateral marginal sections 22 are of equal width while the leading end section 14 is substantially longer than trailing end section 18.

The two elements are secured together at their lateral edges by a pair of binding strips 26, each secured to the lateral margin of the outer surface of element 10 and to the adjacent lateral marginal section 22 of sheet 12. Materials useful for the binding strips include paper, polymeric films or laminates composed of different materials including paper and polymers.

The processing liquid for each film unit is supplied in a rupturable container 28 of a type well-known in the art and described, for example, in U.S. Pat. No. 2,543,181. Container 28 is formed by folding a rectangular blank of a fluid and vapor impervious sheet material medially and sealing the marginal sections of the blank to one another to form a cavity for containing processing liquid designated 30. The seal between the longitudinal marginal sections 32 is weaker than the seals at the ends of the container so that in response to the application of compressive pressure to the walls of the container in the region of the liquid-filled cavity, there will be generated within the liquid hydraulic pressure sufficient to separate longitudinal marginal sections 32 throughout the major portion of their length to form a discharge mouth which is preferably equal in length to the liquid-filled cavity. The latter is preferably at least substantially equal in length to the width of the exposed area of the photosensitive layer. Container 28 is mounted on leading end section 14 of element 12 with the edge of marginal sections 32 located closely adjacent the leading edge 16 of element 10, and the opposite longitudinal edge of the container at which the blank is folded, is located closely adjacent and in parallel relation with the end edge of element 12.

Means are provided for securing container 28 to elements 12 and 14 so as to retain the container in place and provide a passage for conducting the liquid contents of the container from the cavity within the container between layers of elements 10 and 12 as compressive pressure is applied to the container to eject its liquid contents therefrom.

These last-mentioned means include an elongated retaining strip 34 folded longitudinally to form two sections, one of which is adhered to element 14 adjacent the leading edge thereof between element 14 and a longitudinal edge portion of container 28. The other section of retaining strip 34 is folded around the longitudinal edge portion of the container and is secured to the outer marginal surface of the container. The overall length of the container is approximately equal to the width of element 10 and retaining means in the form of relatively short retaining strips 36 are secured to the end margins of container 28 and lateral marginal sections 22 of element 12. Retaining strips 36 are preferably equal in length to the width of the container and equal in width to retaining strips 26 so that one end edge of each retaining strip 36 abuts an end edge of one of the retaining strips 26 while the other end edge of each retaining strip 36 is aligned substantially with the leading edge of second element 12. Means in the form of another retaining strip 38, approximately equal in length to the width of element 12, is secured to one marginal section 32 of container 28 and the outer surface of the leading edge section of element 10 so as to bridge the gap between the container and element 10 and provide a passage for confining the processing liquid within the film unit as the liquid is ejected from the container. Retaining strips 34, 36 and 38 may be formed of the same material as binding strips 26 and are adhered to the elements and the container in the same manner.

In the embodiment of the film unit in which first and second elements 10 and 12 are separate, individual elements secured together only at their margins, the liquid contents of container 28 will be spread between the elements as the film unit is moved, container foremost, between a pair of juxtaposed members which first apply compressive pressure to the container to rupture the seal between marignal sections 32, ejecting the liquid from the container between the marginal sections so that it is forced to flow between elements 10 and 12. In the alternative embodiment of the film unit in which elements 10 and 12 are laminated to one another to form an integral unit, the bond between a particular pair of adjacent layers or strata will be weaker than the physical bond between any other pair of adjacent layers or strata so that the hydraulic pressure of the liquid which is confined within the film unit, will rupture the laminate where the bond is weakest, permitting the liquid to spread between elements 10 and 13 toward the trailing end of the film unit. Another function of lateral binding strips 26 is to aid in processing, specifically, the spreading of the processing liquid between the elements of the film unit. Processing means in the form of juxtaposed rollers are well-known in the art for applying compressive pressure to the film unit, progressing from the leading end toward the trailing end so as first to eject the liquid contents of the container and then distribute the liquid between elements 10 and 12 toward the trailing ends of the elements. Lateral binding strips 26 provide means for predeterminately spacing apart the pressure-applying rollers so as to provide a space between the medial portions of elements 10 and 12 in which the processing liquid can be spread in a layer of predetermined thickness. Other functions performed by the binding strips are to prevent escape of the processing liquid from between elements 10 and 12 at the margins thereof and prevent admission of air between the elements.

The first and second elements 10 and 12 are secured to one another at their trailing ends by retaining means in the form of a trailing end retaining strip 44, equal in length to the width of element 12 and secured along one edge to trailing end section 18 of second element 12 adjacent the trailing edge of the second element. End retaining strip 44 is folded upon itself and secured along its opposite longitudinal margin to the outer surface of first element 10 adjacent the trailing edge thereof and the trailing end portions of lateral binding strips 26. The ends of retaining strip 44 are adhered to the lateral margins of the trailing end section of element 12.

In order to insure the spreading of the processing liquid in a layer of predetermined uniform thickness throughout an area at least coextensive with the exposed area of the photosensitive layer, excess processing liquid is supplied within the container. Liquid trapping and retaining means are provided within the film unit for trapping and retaining any excess processing liquid that may be spread beyond the trailing edge of first element 12. These means comprise a pocket formed by retaining strip 44 and a spacing element (or elements) 46 enclosed within the pocket by retaining strip 44 and the trailing end section 18 of element 12. Spacing element 46 is designed to space apart the inner surfaces of retaining strip 44 and second element 12 as the pressure-applying members pass over the trailing end of the film unit so that a space remains within the film unit in which the excess processing liquid overrun is trapped and retained. Spacing elements suitable for this purpose are well-known in the art and in the form shown, spacing element 46 consists of a strip formed with openings in which the excess processing liquid can collect.

The film unit includes a masking layer designated 50, having as its basic function, the provision of a sharply defined image-free border surrounding a high quality transfer image extending to the edges of the border. Masking layer 50 is applied to the second element during manufacture, extends to the edges of the second element and is formed with a rectangular opening 52 having sharply defined edges. Opening 52 defines the extent of the visible image, is slightly smaller than first element 10 and is symmetrically located with respect to the first element with the edges of opening 52 parallel with and equally spaced from adjacent edges of the second element. The edges of the opening 52 are also spaced inwardly from the edges of the film unit so as to be located inwardly from the edges (inner) of binding strips 26 and retaining strips 38 and 44, such that when viewed from the side of the transparent element, the edges of the strips underlie the masking layer. The binding and retaining strips limit and define the region in which the liquid is distributed. This construction in which the edges of the strips underlie the masking layer and are outside the image area is significant because it permits the processing liquid to be distributed laterally and lengthwise beyond the edges of the image area into regions underlying the masking layer to provide sufficient processing liquid to insure proper and complete transfer image formation.

Masking layer 50 comprises a pigment such as titanium dioxide carried in a suitable binder, preferably a polymer which is a liquid during formation of the masking layer and solidifies to form a stable adherent layer. The masking layer can be formed or applied to element 12 by a number of well-known systems including, for example, conventional printing methods such as the gravure process. The masking layer is located layerwise within the film unit such that the processing liquid will be distributed behind the masking layer, that is, to the side thereof opposite the transparent support. This is to insure that any diffusible, image-providing material (dye) formed outside (laterally and lengthwise) of the image area defined by opening 52, will underlie the masking layer and will be hidden from view thereby. The preferred location of the masking layer is between the image-receptive layer 11 and the layers or strata associated therewith as shown in FIG. 2 and may be located directly on the inner surface of support sheet 22. However, depending on the nature and composition of the masking layer and particularly, the composition of the polymeric binder and the density of the reflecting agent, the masking layer may be disposed within the multilayer structure, for example, between the photosensitive layer designated 13 and the image-receptive layer.

As will be noted from the description of the film unit, the manufacturing process involves fabrication and assembly of 11 separate components including first element 10, second element 12, two binding strips 26, two retaining strips 36, container 28, retaining strips 34, 38 and 44, a spacer element 46, and masking layer 50. It is important that these elements, or components, be fabricated accurately and located and assembled together in relatively precise positions. These operations involve a number of manipulative steps including location of the various components, cutting, folding and sealing or adhering elements to one another. In addition, during any fabrication and assembly process such as described, frequent monitoring and inspection is performed at or between successive fabrication and assembly stages in the process in order to insure that each operation has been performed properly.

As previously noted, in order to make the mass production of such a film unit economically feasible, fabrication, assembly and inspection must be accomplished by high-speed, automatic machinery and the present invention contemplates a novel and improved fabrication and assembly process particularly adapted to be performed in automated, mass production machinery. The basic problems in designing such a process include minimizing the number of operations to be performed and whenever possible, limiting the operations to those which can be performed rapidly, continuously and with relatively simple equipment. Another problem peculiar to the fabrication and assembly of a succession of photographic film units is the transport of the components of each film unit through a succession of machine stations in which the various operations, including fabrication, assembly and inspection are performed and, if possible, to maintain the film units in an interconnected form while designing and arranging the fabrication and assembly process such that no operations need to be performed on individual film units.

An important feature of the present invention is the provision of a fabrication and assembly process in which transport of a succession of film units through successive fabrication and assembly stations of the automatic machinery is achieved by utilizing common components of the film units themselves and designing the various operations so that the final step in the manufacturing process is separating each film unit, as it is completed, from the remainder of the interconnected, in-process film units. The preferred characteristic for this "carrier component" are that it be strong, dimensionally stable, and essentially endless, having a length sufficient to extend completely through the multiplicity of fabrication, assembly and inspection stations. According to the method of the invention, the carrier comprises two strips or webs which are at least fastened and preferably laminated, to one another to form a sandwich at an initial stage in the assembly process. FIGS. 3 through 7 illustrate the fabrication, assembly and lamination of these two webs to form a sandwich on which the other components of a succession of film units are mounted during the continuous or intermittent movement of the web through the successive assembly stations of an automatic machine until the final operation wherein each completed film unit is severed from the remainder of the sandwich.

Figures 3, 4, 5, 6:
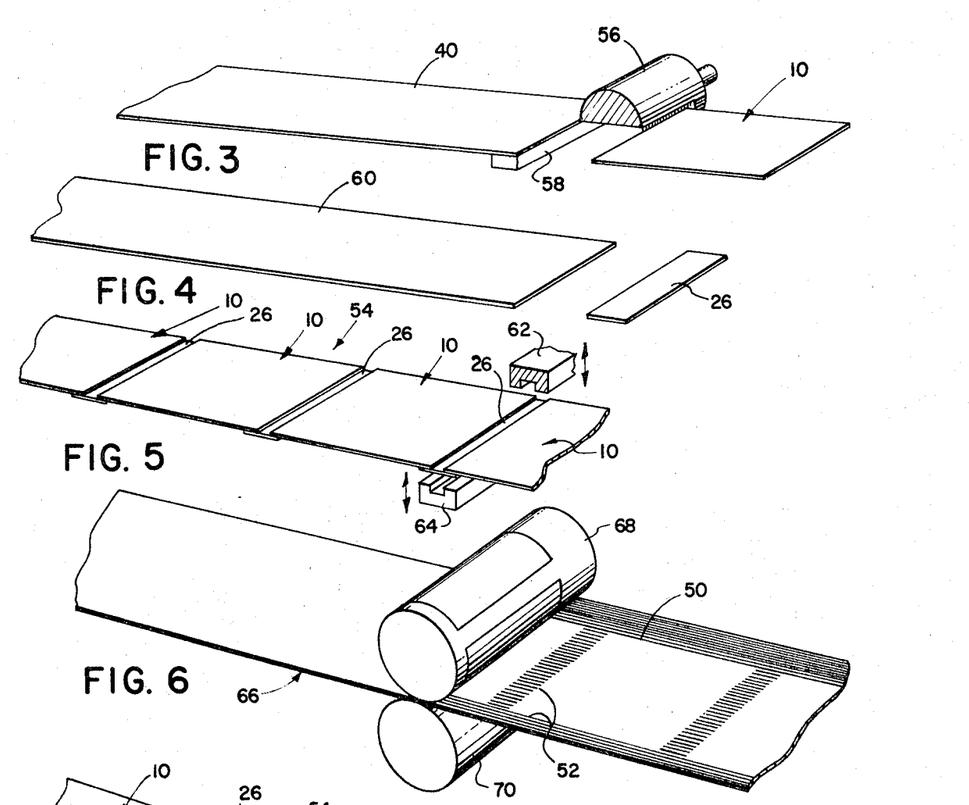
FIGS. 3–7 are somewhat schematic, perspective views illustrating a succession of fabrication and assembly operations involved in the manufacturing method of the invention.

The initial steps in the film manufacturing process involve the fabrication of the webs which are assembled in face-to-face relation to form a sandwich adapted to function as a carrier through the remaining fabrication, assembly and inspection operations. The first of these webs, generally designated 54, is formed as shown in FIGS. 3 through 5 by cutting a strip 40 of sheet material into lengths each equal in length to a first element 10 and comprising the first element 10 of each film unit. Strip 40 is equal in width to the length of elements 10 and for severing the strip into elements 10, conventional cutting means such as a rotary knife 56 and anvil 58 may be employed. A strip 60 of sheet material having a width equal to the length of binding strips 26, is cut into short lengths each comprising a binding strip 26. Each binding strip 26 is secured to adjacent leading and trailing edges of successive elements 10 by heat-sealing the strip 26 to the spaced margins elements 10 employing conventional heat-sealing jaws 62 and 64 as shown in FIG. 5. Strip 60 and the individual binding strips 26 severed therefrom preferably comprise a sheet material such as paper, coated on one side with an adhesive such as a thermoplastic polymer, adapted to be activated by the application of heat and pressure between jaws 62 and 64. The end edges of adjacent elements 10 are spaced apart by a distance approximately one fourth the width of strips 26 and the elements and the strips, in combination, form a continuous web, designated 54, having a width equal to the width of elements 10.

The individual second elements 12 comprise sections of an elongated second web 66 adapted to be cut into sections each comprising a second element 12. Web 66 is coated with the various layers and strata comprising the second or image-receiving elements of the film units and in the operation shown in FIG. 6, masking layer 50 is applied to second web 66 by a conventional system such as a gravure process employing gravure roll 68 and roll 70. The gravure process is conventional so that the apparatus for performing this process is not shown in detail except for rolls 68 and 70 which actually contact web 66.

Figure 7:
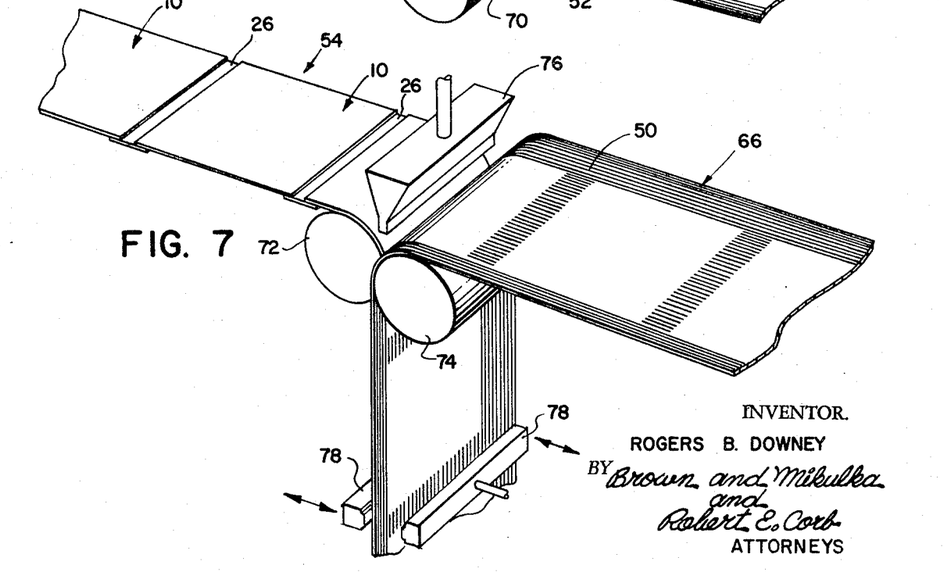

Web 54 composed of photosensitive elements 10 and strips 26 and web 66 bearing masking layer 50, are advanced into superposed relation between a pair of pressure applying rollers 72 and 74 as shown in FIG. 7 for the purpose of laminating the two webs to one another to form a sandwich. Web 54 is narrower than web 66, the latter having a width approximately equal to the length of the completed film units and the two webs are located such that the lateral edges of web 66 which form the ends of the finished film unit extend beyond the lateral edges of web 54. The laminating process essentially comprises guiding webs 54 and 66 along converging paths into superposed relation between rollers 72 and 74 and distributing a laminating liquid between the webs while pressing them into face-to-face contact between the laminating rollers. A nozzle 76 is provided for supplying the laminating liquid to the convergent space between the webs at the nip of the rolls preferably to form a meniscus of the liquid which adheres the sheet to one another. Inasmuch as the photosensitive and image-receiving elements 10 and 12 may include facing surface layers formed of water-soluble polymers such as gelatin and polyvinyl alcohol, the laminating liquid preferably includes water and water-soluble a polymeric film-forming material adapted to assist in the formation of an easily ruptured bond between the sheets. For specific example of such materials and methods of laminating photosensitive and image-receiving elements, further reference may be had to the copending U.S. patent application of Albert J. Bachelder et al., Ser. No. 744,912 filed July 15, 1968.

Following lamination of photosensitive elements 10 of web 54 to web 66 comprising a sequence of second elements 12, binding strips 26, which at this stage function as connecting strips joining elements 10 to one another, are adhered to the facing surface of web 66 in transverse regions aligned with transverse portions of masking layer 50. For this purpose, conventional heat-sealed jaws 78, movable into compressive engagement with the two webs, are provided downstream from laminating rollers 72 and 74. As previously noted, the assembly process, illustrated in its entirety in FIG. 14, at least commences immediately following lamination of webs 60 and 66. This process may involve either intermittent or continuous movement of the sandwich and in the latter event, jaws 78 may be mounted for movement in engagement with the moving sandwich or they may comprise peripheral sections of heat-sealing rolls.

Figures 12, 13:
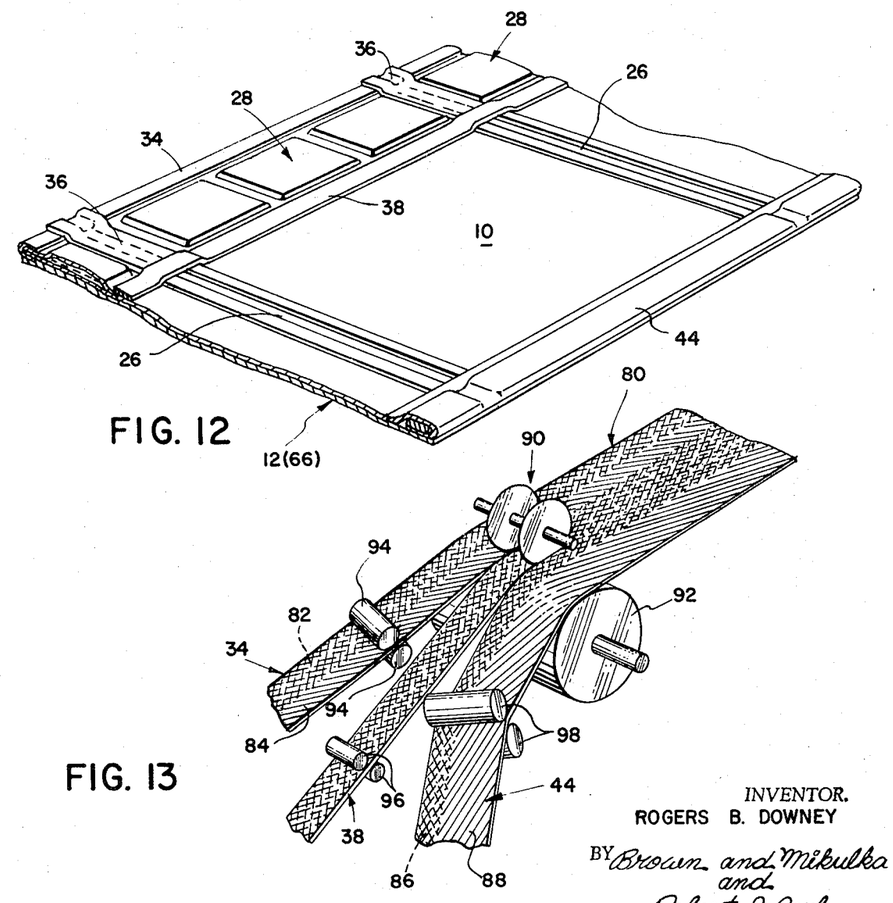
FIG. 13 is a somewhat schematic, perspective view illustrating a fabrication operation in the method of the invention.

The next steps in the assembly operation involve the adherence of retaining strips 34 and 44 to the lateral margins of web 66. Strips 34 and 44 may be attached as individual strips having lengths approximately equal to the width of a film unit. However, in the preferred embodiment of the process adapted to continuous movement of the webs and sandwich through the assembly machine, strips 34 and 44 are continuous, elongated and formed as shown in FIG. 13. An elongated web 80 of a sheet material appropriately coated with stripes of heat-activated adhesive such as thermoplastic polymer, is slit to form three strips designated 34, 38 and 44. Strip 34 is coated on opposite surfaces with stripes 82 and 84 of a heat-activated adhesive. Strip 38 has one surface covered completely with a layer of a similar heat-activated adhesive and strip 44 is coated on opposite surface with stripes 86 and 88 of the same heat-activated adhesive or thermoplastic material.

A conventional sheet slitter, shown in FIG. 13 as including two of rotary knives 90 and a backing roll 92, is provided for slitting web 80 into strips 34, 38 and 44. Three sets of guide rollers 94, 96 and 98 are provided for guiding the three strips along separate paths toward the stations in the assembly machine in which the strips are assembled with the other components of the film unit.

Figures 8, 9, 10:
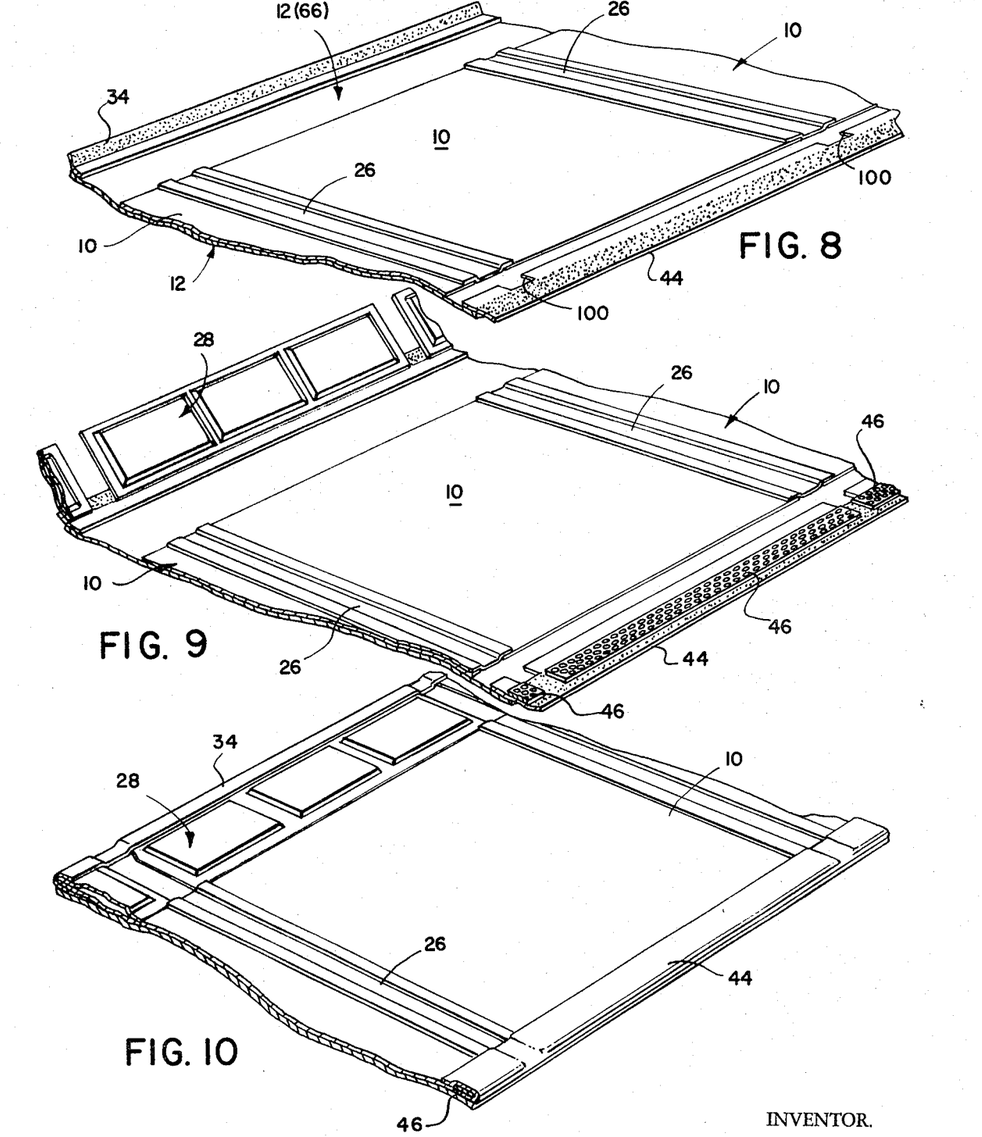
FIGS. 8–12 are perspective views of a portion, including one film unit, of a multiplicity of connected film unit components illustrating the film unit and its components at various stages in their fabrication and assembly to show the operations performed on the components of the film unit.

As shown in FIG. 8, strip 34 is adhered at stripe 84 to a lateral margin of web 66 and strip 44 is adhered at stripe 86 to the opposite lateral margin of web 66 by conventional heat-sealing means such as opposed pairs of heat-sealing rollers (not shown). Prior to being heat-sealed to web 66, strip 44 may be formed with notches 100 located in alignment with the spaces between adjacent edges of photosensitive element 10. The function of notches 100 will appear hereinafter.

Figure 14:
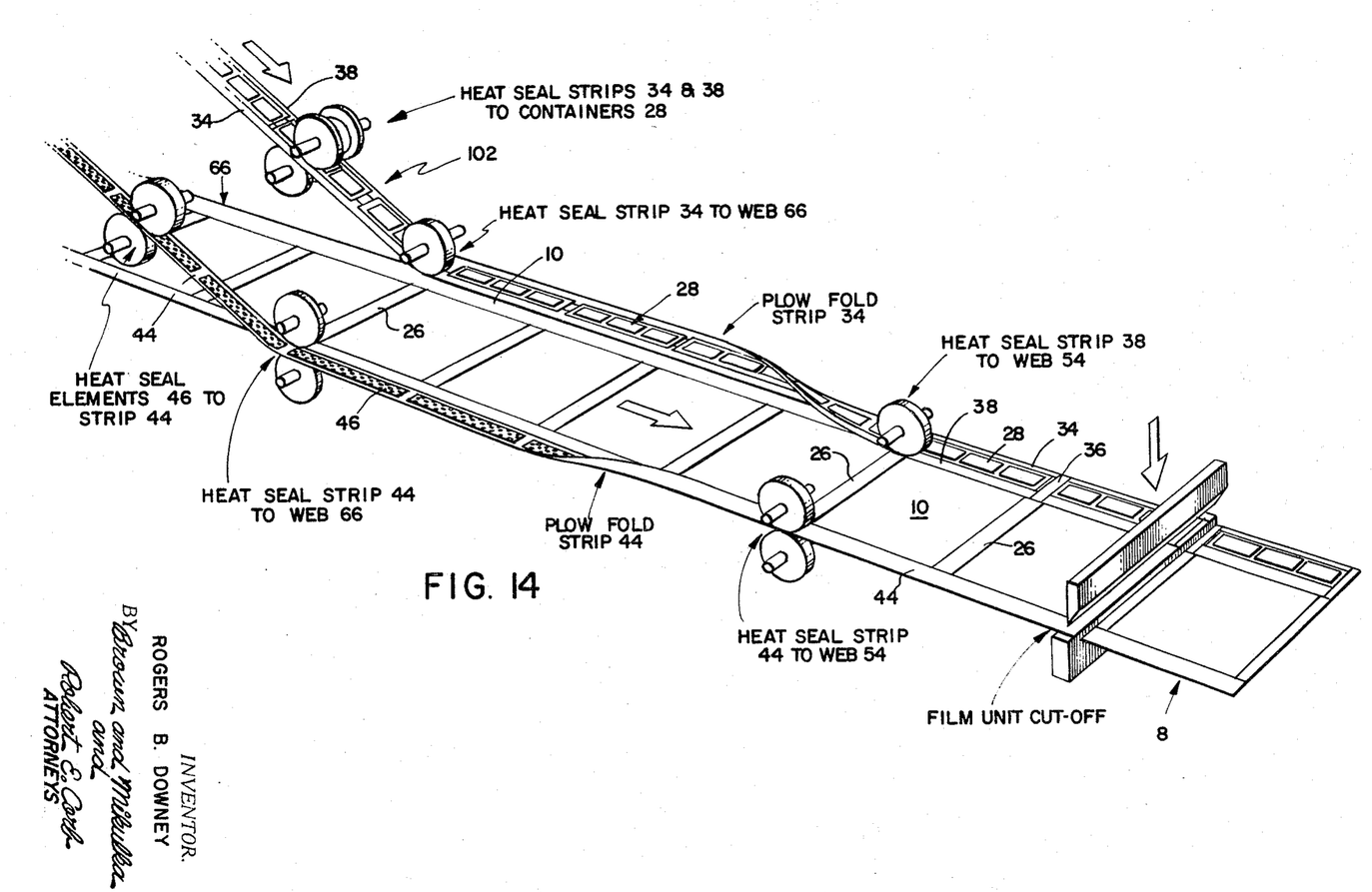
FIG. 14 is a somewhat schematic, perspective view illustrating a combination of sequential fabrication and assembly operations constituting the manufacturing method of the invention.

At the next station or stations in the film assembly apparatus, a container 28 is attached as shown in FIG. 9, at a transverse longitudinal edge thereof to lateral margin portion of strip 34 by compressing the strip and the container between a pair of heat-sealing members to activate adhesive stripe 82 and thereby attach the container to the surface of strip 34 opposite the surface at which the strip is attached to photosensitive element 10. In a continuous assembly process, such as illustrated in FIG. 14, the containers may be connected to one another, by strip 34 to form a continuous web 102 of conected containers thereby permitting continuous motion of web 66 during attachment of the containers thereto. In this latter embodiment of the invention, strip 38 may also be attached to the succession of containers to form web 102.

A spacing element 46 is mounted in a similar manner on strip 44 at the opposite edge of web 66 by compressing spacing element 46 and strip 44 between a pair of heat-sealing members to activate adhesive strip 88 on retaining strip 44. In the alternative embodiment shown in FIG. 14, a succession of elements 46 may be mounted on strip 44 prior to adherence of the strip to web 66.

The next operations in the fabrication and assembly process are folding operations in which strip 34 to which a container 28 is attached, and strip 44 to which a spacing element 46 is attached, are folded through 180°. This brings the container into face-to-face relation with the lateral edge section of web 66 comprising leading end section 14 of a film unit 8. Similarly, spacing element 46 is brought into face-to-face relation with the opposite lateral edge portions of web 66 and element 10 which form respectively trailing end section 18 of element 12 and trailing edge 20 of element 10. The folding operations may be performed by conventional means such as plows and/or movable fingers well known in the art. This folding operation in which a succession of containers and spacing elements are connected by containuous webs is illustrated in FIG. 14.

The next assembly operations are illustrated in FIG. 10 and involve heat-sealing the margin of strip 44 to the surface of sheet 10 near the trailing edge thereof to confine the spacing element 46 between elements 10 and 12 and strip 44 and provide spaces therebetween in which excess processing liquid can be collected and retained. Notches 100 in strip 44 permit the strip to be heat-sealed directly to element 14, adjacent the ends of spacing element 46, between adjacent elements, and thereby prevent escape of excess processing liquid from each film unit near the trailing end corners thereof. Retaining strip 44 is adhered to photosensitive element 10 and second element 12 by applying heat and compressive pressure to the strip and elements to activate adhesive strip 88 adjacent the end and one longitudinal margins of spacing element 46. Conventional heat-sealing means may be employed for this purpose. In the embodiment shown in FIG. 14 at this stage in the process strip 38 will also be adhered to the leading end portion of elements 10 preferably during the continuous motion of the sandwich between a pair of heat-sealing members.

Figure 11:
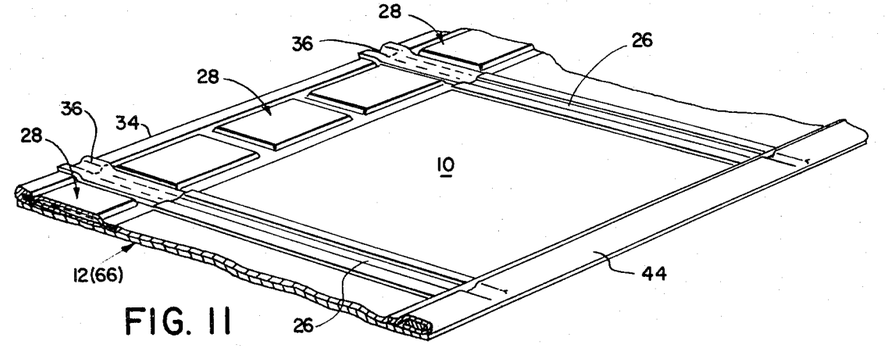

In the assembly operation illustrated in FIG. 11 retaining strips 36 are adhered to the end margins of adjacent containers 28 and web 66 intermediate the ends of the containers, again by conventional compressive heat-sealing means. In the process shown in FIG. 14, this is the last assembly operation. However, as illustrated in FIG. 12, in the process in which strip 38 is not attached to the containers during an earlier operation, the last operation involves adhering retaining strip 38 to marginal section 32 of containers 28 and the leading end margin of photosensitive element 10 adjacent leading edge 16 thereof by applying heat and compressive pressure to activate the adhesive with which strip 38 is coated. Retaining strip 38 may be applied as a continuous operation utilizing a pair of heated pressure-applying rollers for this purpose.

Following the last assembly operation whether it be the heat-sealing of strip 38 to the succession of interconnected film units, or attaching retaining strip 36 to the ends of the containers, the sandwich carrying the film unit components is advanced as shown in FIG. 14, between a conventional knife and anvil, which cooperate to sever the sandwich at lateral binding strips 26 intermediate the lateral edges of first element 10. Web 66 and binding strip 26 are cut substantially midway between the lateral edges of element 10 to form individual film units 8 of substantially uniform width and length.

The fabrication and assembly apparatus will also include a number of inspection stations which serve to insure that each successive fabrication and assembly operation has been performed correctly. These inspection means may include, for example, means adapted to determine whether or not the photosensitive and image-receiving sheets and masking layer are properly located with respect to one another and retaining strip 26; that the leading edge 16 of photosensitive element 10 is properly located with respect to the edge of container 28; that the exposure opening 52 in the masking layer is of proper size and is correctly located with respect to binding strips 26, retaining strip 44, and retaining strip 38; that spacing element 46 attached to strip 44, is properly located thereon; that a container 28 is adhered to strip 34 and the latter is adhered to web 66; and that the various folding and sealing operations have been performed as required. Inspection means suitable for this purpose are well-known in the art and include mechanical, optical and pneumatic devices for sensing the presence and location of various components. Continuous monitoring of the fabrication and assembly process is preferred in order to promptly identify improperly fabricated or assembled film units immediately following each fabrication or assembly step being monitored so that action can be taken to correct the operation which is resulting in the defect and to promptly identify the defective film units so that successive assembly operations are not performed thereon and components wasted. Following severance from the remainder of the interconnected film units in preceding stages of the film manufacturing process, each improperly or incompletely assembled film unit may be rejected or set aside for salvage of components or for further remedial work.

As will be seen from the foregoing the invention provides a novel method of fabricating and assembling a self-developing, photographic film unit of the type comprising a multiplicity of components. An important feature of this method is the use of a component common to a succession of film units as a carrier for supporting and transporting the film unit components through all of the successive fabrication, assembly and inspection operations, which are part of the manufacturing process, thus eliminating the necessity for expensive machinery for transporting a succession of film units through a series of machine stations at which the various fabrication, assembly, and inspection operations are performed. The use of a common component in the form of two elongated webs joined to form a sandwich not only simplifies the transport machinery required, but materially contributes to the ability to perform the fabrication, assembly and inspection operations in rapid sequence in a machine that is automatic in its operation to produce a large number of film units having close dimensional tolerances while eliminating a large portion of waste normally associated with such assembly operations. Additionally, many of the components of each film unit constitute a part of a large component shared by another film unit during the assembly process thereby reducing the actual number of components required to be fabricated, handled and assembled.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. A method of forming a succession of photographic film units, each comprising first and second sheets secured in face-to-face relation at least along one lateral and two transverse margins, said method comprising the steps of:
   joining a succession of rectangular first sheets to one another to form a continuous web by locating pairs of said first sheets in adjacent, spaced relation and securing relatively narrow connecting strips to adjacent transverse margins of said first sheets to bridge the spaces therebetween, said connecting strips being capable of adhering said first sheets to a second sheet;
   bringing said web and a second sheet wider than said web into face-to-face relation with at least one lateral margin of said second sheet extending beyond a lateral edge of said web;
   securing said connecting strips to the surface of said second sheet facing said web in regions intermediate said first sheets to form a double web;
   securing a rupturable container of processing liquid adjacent a lateral edge of each of said first sheets so that upon application of compressive force said container will distribute its contents between said first and second sheets;
   binding the lateral edges of said first and second sheets opposed to the edges upon which said rupturable containers are secured to prevent escape of processing liquid therethrough; and severing said double web substantially medially through said connecting strips to form a succession of individual film units, each comprising said first and second sheets bound by said connecting strips along their transvesre edges.

2. The method of claim 1 wherein, as said web and said second sheet are brought into face-to-face relation, a liquid for effecting bonding between said first and second sheets is distributed therebetween and said first and second sheets are compressed to laminate them to one another, said bond between said first and said second sheets being weaker than the bond between any layers comprising said first web and said second sheet.

3. The method of claim 2 wherein said first and second sheets are laminated to one another prior to securing said connecting strips to said second sheet.

4. The method of claim 1 further including the step of securing an end binder strip to the surface of said second sheet which faces said first sheet adjacent the lateral edge of said second sheet opposed to the rupturable container and folding said end binder strip lengthwise and securing it to the outer surface of said first sheet.

5. The method of claim 4 wherein said end binder strip is a continuous strip having a length at least equal to the length of a section of said first web including a plurality of said first sheets and is severed simultaneously with said connecting strips.

6. The method of claim 5 including the steps of mounting a liquid trapping and retaining element on said end binder strip prior to folding said end binder strip so that said element is confined between said end binder strip and said first and second sheets.

7. The method of claim 6 wherein said liquid trapping and retaining element is substantially equal in length to the width of one of said first sheets and said end binder strip is secured to said second sheet between the ends of adjacent liquid trapping and retaining elements.

8. The method of claim 4 wherein each of said end binder strips is approximately equal in length to a lateral edge of one of said film units and is secured to the lateral edge of one of said first sheets opposed to said rupturable container.

9. The method of claim 8 including the steps of mounting a liquid trapping and retaining element on each of said individual end binder strips prior to folding said each end binder strip so that said element is confined between said each end binder strip and said first and second sheets.

10. The method of claim 1 including the steps of securing said rupturable container to said film unit by means of a retaining strip secured to a lateral edge of said second sheet.

11. The method of claim 10 wherein a sealing strip is secured across a rupturable seal of said rupturable container along substantially the entire lateral edge of said first sheet adjacent said rupturable container.

12. The method of claim 11 wherein said retaining strip and said sealing strip are each secured as continuous strips to a section of said second sheet having a length at least equal to the length of a section of said first web including a plurality of said first sheets, and are severed simultaneously with said connecting strips.

13. The method of claim 10 wherein said retaining strip is a continuous strip having a length at least equal to the length of a section of said first web including a plurality of said first sheets and is severed simultaneously with said connecting strip.

14. The method of claim 12 wherein each of said containers is substantially equal in length to a lateral edge of one of said first sheets, said lateral sealing strips are secured to the ends of adjacent containers and portions of said second sheet intermediate said adjacent containers to bridge the gap therebetween and said lateral sealing strips are severed simultaneously with said connecting strips.

15. The method of claim 1 wherein said second sheet comprises an integral mask capable of defining a viewing aperture therethrough.

16. The invention of claim 15 wherein said mask is printed on said second sheet.

17. The invention of claim 16 wherein said printed mask is printed on the side of said second sheet in face-to-face relation with said web comprising said first sheets.

18. The invention of claim 17 wherein said mask comprises titanium dioxide carried in a suitable binder.

19. The invention of claim 17 wherein said mask is printed by means of a gravure roll.

References Cited
UNITED STATES PATENTS

| | | | |
|---|---|---|---|
| 1,610,134 | 12/1926 | Jones | 156—266 |
| 1,564,374 | 12/1925 | Smith | 156—202 |
| 1,985,480 | 12/1934 | Carpenter | 156—277 |
| 2,653,888 | 9/1953 | Hyman | 156—271 |
| 2,971,874 | 2/1961 | Canno | 156—202 |

JACOB H. STEINBERG, Primary Examiner

U.S. Cl. X.R.

156—202, 254, 277